Nov. 25, 1969 — H. F. RIETH — 3,480,808

POWER GENERATOR

Filed Jan. 14, 1964 — 2 Sheets-Sheet 1

INVENTOR:
Harold F. Rieth

Attorneys

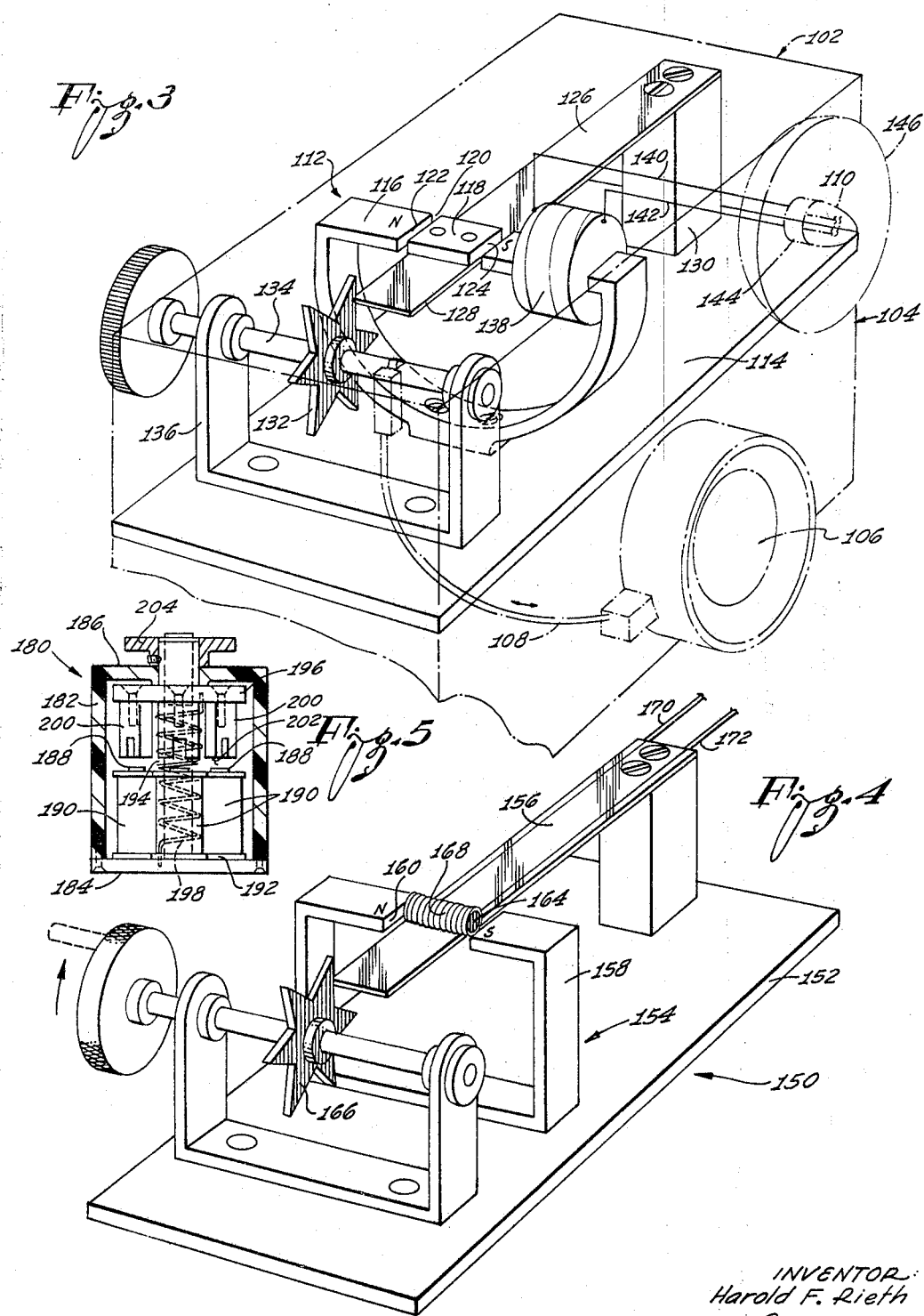

United States Patent Office 3,480,808
Patented Nov. 25, 1969

3,480,808
POWER GENERATOR
Harold F. Rieth, Santa Monica, Calif., assignor to Packard-Bell Electronics Corporation, Los Angeles, Calif., a corporation of California
Filed Jan. 14, 1964, Ser. No. 337,582
Int. Cl. H02k 33/00, 35/02
U.S. Cl. 310—25                              3 Claims The present invention relates to electrical power supplies, and more particularly to means for generating a pulse of electrical energy.

Certain types of electrical equipment are only energizd for relatively short intervals of time. By way of example, it may be desirable to momentarily light or flash a lamp such as an incandescent lamp so as to produce a signal or to briefly illuminate an area. It may be desirable to energize a photoflash bulb for momentarily illuminating an area to be photographed. It may be desirable to transmit a signal suitable for indicating the occurrence of a particular event such as the opening of a door or the failure of a piece of machinery. It may be desirable to transmit a control signal that will actuate a remote piece of equipment such as a television receiver. Devices for accomplishing the foregoing and similar applications are similar in that they require a relatively short burst or pulse of energy. Heretofore, a battery has frequently been provided to supply the necessary energy. In spite of the limited energy normally required for such purposes, the batteries have a limited capacity and rapidly become discharged if they are used very much. In addition the batteries have a limited shelf life and become discharged and/or deteriorate to a level where they are no longer usable. It may thus be seen that devices of the foregoing nature require frequent replacement of the batteries and are unreliable. The batteries are also bulky and heavy and therefore unduly increase the size and weight of the device. It may therefore be seen that control devices for producing occasional and short bursts or pulses of energy and particularly the power supplies therefor have not been entirely satisfactory for numerous reasons.

It is now proposed to provide control means which will overcome the foregoing difficulties. More particularly, it is proposed to provide control means which have an indefinite shelf life and may be operated any number of times without requiring any servicing or replacement of any part such as batteries, etc. This is accomplished by providing control means employing power supply means that will not deteriorate with age and may be instantly used at any time. The power supply means includes a magnetic circuit having a first core member with a flux field permanently maintained across an air gap in the member. A second core member is carried by a spring so that it may oscillate into and out of the air gap as the spring vibrates and thereby vary the flux density in the circuit. Coil means are provided on one or more of the core members so as to encompass at least a portion of the flux field. As a consequence, if the spring is deflected out of its neutral position and allowed to vibrate, the second core member will oscillate through the air gap. The resultant changes in the flux density in the magnetic circuit will generate a pulse of energy in the coil.

These and other features and advantages of the present invention will become readily apparent from the following detailed description of a plurality of embodiments thereof, particularly when taken in connection with the accompanying drawings wherein like reference numerals refer to like parts, and wherein:

FIGURE 3 is a perspective view of a camera and photoflash employing a power supply embodying a different form of the present invention;

FIGURE 4 is a perspective view of a power supply embodying another form of the present invention; and FIGURE 5 is a cross-sectional view of a power supply embodying another form of the present invention.

Figure 1:
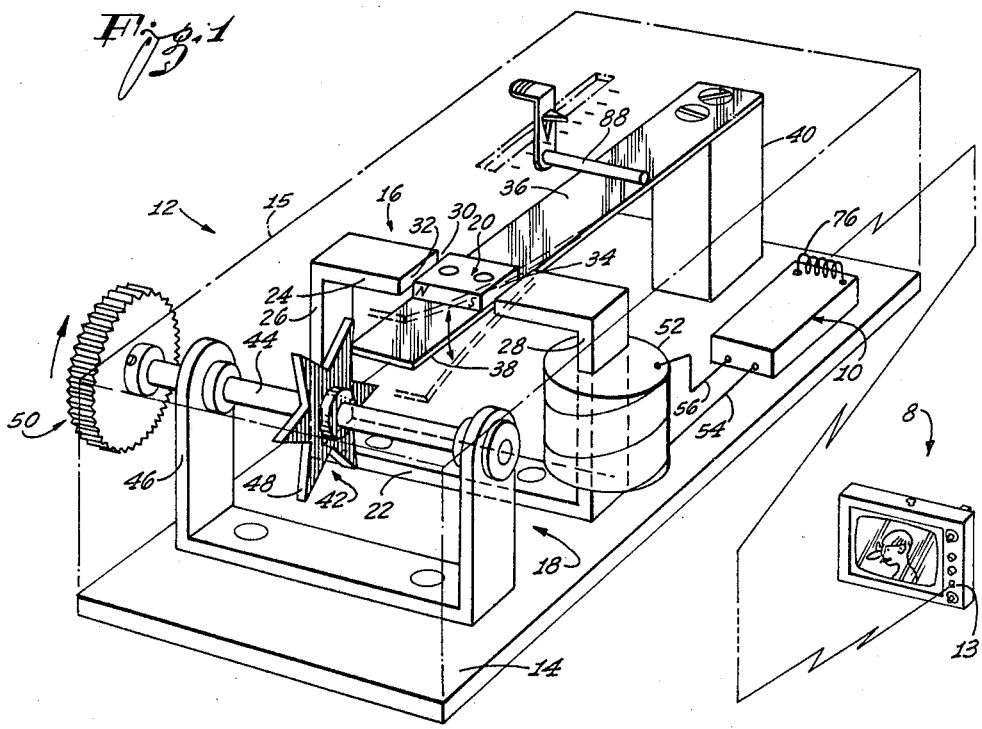
FIGURE 1 is a perspective view of a power remote control system employing a supply embodying one form of the present invention.
Figure 2:
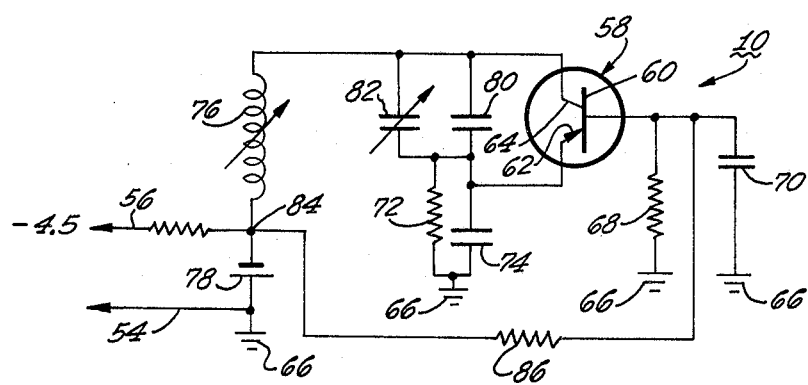
FIGURE 2 is a wiring diagram of a transmitter for being operatively interconnected with the power supply for radiating a signal when the power supply is energized.

Referring to the drawings in more detail and particularly to FIGURES 1 and 2, the present invention is particularly adapted to be embodied in a remote control system for controlling the various settings of a television receiver 8. The system includes a transmitter 10 that is particularly adapted to transmit electromagnetic signals to a remote control receiver 9 in the television receiver 8. The transmitter 10 includes an electrical power supply 12 for generating electrical energy for energizing the transmitter 10. The present power supply 12 generates a short burst or pulse of energy that will be effective to cause the transmitter 10 to radiate a command signal of approximately the same duration.

The various elements of the power supply 12 are secured to a support so as to be carried thereby. Although the support may be of any desired construction, in the present instance it includes a flat metal plate 14 having a rectangular shape. A cover such as shown by dashed line 15 may be secured to the plate 14 so as to enclose the operative elements of the power supply 12.

In order to permit the generation of electrical energy, a magnetic circuit 16 is provided. In the present instance, this magnetic circuit 16 includes a first core member 18 and a second core member 20. The core members 18 and 20 may include a magnetic material such as iron having a high permeability. This will permit a flux field having a high flux density to be maintained within the magnetic circuit 16. The first core member 18 may be of any desired shape such as a rectangle having a pair of parallel sides 22 and 24 and a pair of parallel ends 26 and 28.

One of the sides 22 is secured to the plate 14 at approximately the center thereof so that the core member 18 will extend transversely of the plate 14. The opposite side 24 of the core member 18 has an opening therein which is adapted to form an enlarged air gap 30. The opposite ends of the air gap are bounded by pole faces 32 formed by the ends of the core member 18. It may be appreciated that any flux in the core member 18 will circulate around the magnetic circuit 16 and extend across the air gap 30.

The second core member 20 may be approximately the same length as the air gap 30. As a consequence, the second core member 20 may be readily moved into and out of the air gap 30. The opposite ends of the second core member 20 will form a pair of pole faces 34. When the second core member 20 is disposed in the air gap 30, the faces 32 on the ends of the first core member 18 will be disposed immediately adjacent the pole faces 34. During this condition, the effective length of the air gap 30 will be reduced to a minimum. This will reduce the overall reluctance of the magnetic circuit to a minimum and permit the flux field to have a maximum density.

When the second core member 20 moves away from the air gap 30, the volume of the second member 20 present in the air gap 30 will progressively diminish and the effective size of the air gap 30 will increase. The increasing size of the air gap 30 will increase in the reluctance of the magnetic circuit 16 whereby any flux in the circuit 16 will have a minimum density.

The second core member 20 may be supported in position, by any suitable means such as a suitable resilient support. The present support includes a leaf spring 36. One end of this leaf spring 36 is secured to the support plate 14 so as to be carried thereby. The second end 38 of the spring 36 is left free so that it may vibrate. In order to position the free end 38 of the spring 36 in the proximity of the air gap 30, a pedestal 40 is secured to the plate 14 so as to project upwardly therefrom.

The second core member 20 may be rigidly secured to the spring 36 adjacent its free end 38 so that the second core member 20 will be centered in the air gap 30 when the spring 36 is in its neutral position. However, when the spring 36 is deflected from its neutral position, second core member 20 will be at least partially removed from the air gap 30.

It may thus be seen that the spring 36 is a cantilever and will vibrate in a direction normal to the planes of the spring 36 and the support plate 14. When the spring 36 is vibrated in this manner, the second core member 20 will periodically move into and out of the air gap 30 whereby the reluctance of the magnetic circuit 16 will periodically vary in the same manner.

To excite the spring 36 into vibrating, means may be provided that will deflect the free end 38 away from its neutral position and then release it. In the present instance, this is accomplished by means of a star wheel 42 mounted on a shaft 44. The shaft 44 is carried by a bracket 46 positioned so that the ends of the arms 48 on the wheel 42 will just engage the free end 38 of the spring 36. It should be noted that the bracket 46 is sufficiently remote from the first core member 18 to permit the free end 38 of the spring 36 to vibrate through the space between a pair of adjacent arms 48.

A thumb wheel 50 may be secured to one of the outer ends of the shaft 44. The wheel 50 is readily accessible and suitable for being manually actuated by a person's thumb or finger. When the thumb wheel is rotated through some predetermined increment, the end of one of the arms 48 will engage the free end 38 of the spring 36 and deflect it a substantial distance from its neutral position. Eventually, the end of the arm 48 will move beyond the end 38 of the spring 36. When this occurs, the spring 36 will be free to periodically vibrate at its own natural frequency until all of the resonant energy in the spring 36 has been dissipated.

During the course of vibration, the spring 36 will carry the second core member 20 into and out of the air gap 30 formed between the adjacent ends 32 of the first core member 18. As a consequence, the reluctance of the magnetic circuit 16 will also periodically vary.

A magnetomotive force may be applied to the magnetic circuit 16 for maintaining a flux field within the circuit and particularly across the air gap 30. Although the magnetomotive force may be of any suitable variety, in the present instance the second core member 20 is permanently magnetized. The opposite ends 34 of the core member 20 will thus form north and south pole faces and a flux field will be permanently maintained across the air gap 30.

When the second core member 20 is in the air gap 30, the pole faces 34 will be positioned immediately adjacent to the faces 32 on the opposite ends of the first core member 18. Substantially all of the magnetic lines of flux will then pass through the core member 18 and a maximum flux density will be maintained in the magnetic circuit 16. However, when the spring 36 is deflected so as to move the second core member 20 out of the air gap 30, the spacing between the mating faces 32 and 34 will be greatly increased. This will drastically increase the reluctance of the magnetic circuit 16 whereby the flux density will be greatly reduced.

To sense the foregoing variations in the flux density, a suitable coil 52 may be provided around at least a portion of the magnetic circuit 16 so as to encompass substantially all of the lines of flux in the field. In the present instance, this coil 52 is wound so as to be positioned upon the end 28 of the first core member 18. It should be noted that this coil 52 may be positioned at any desired location and if desired may actually include a plurality of coils. When the density of the flux within the magnetic core member 18 varies the changes in the field will be sensed by the coil 52. The coil 52 will thus generate a corresponding voltage. The opposite ends of the coil 52 provide a pair of electrical leads 54 and 56 that will have a voltage therebetween that corresponds to the voltage developed within the coil 52.

It may thus be seen that as the spring 36 vibrates, the core member 20 will move through the air gap 30. The density of the flux field maintained by the permanent magnetizing of the core member 20 will then vary. The voltage generated within the coil 52 and present between the two leads 54 and 56 will be an alternating voltage having a frequency determined by the frequency of the oscillating magnetic field. This frequency will, in turn, be determined by the rate at which the spring 36 vibrates.

The two leads 54 and 56 from the coil 52 are interconnected with the input to the transmitter 10. Although the present power supply 12 is shown in combination with the transmitter 10, it should be understood that it may be employed to energize a virtually unlimited variety of loads. The tranmitter 10 is capable of radiating signals of the electromagnetic variety but if desired the signals may be sonic. In the present instance, the transmitter 10 is a transistorized oscillator having a single transistor 58 with a base 60, an emitter 62 and a collector 64. The base 60 is connected to a ground line 66 by means of resistor 68 and condenser 70 that are disposed in parallel to each other. The emitter 62 is also connected to the ground line 66 by means of a resistor 72 and condenser 74 that are disposed in parallel with each other. The collector 64 is connected to ground line 66 by means of an inductance 76 and a condenser 78.

One or more condensers 80 and 82 may interconnect the collector 64 and the emitter 62 to form a feedback circuit. Because of this feedback, the circuit will be capable of oscillating at some predetermined frequency determined by the various components in the circuit. It may be appreciated that when this oscillator is running, an appreciable amount of energy will be radiated from the inductance 76 whereby a receiver in the vicinity will be capable of receiving this energy. Normally the transmitter is intended to transmit command signals over a relatively short distance. However, if desired the oscillator may be coupled to an antenna for radiating more of the energy over a longer range.

The inductance 76 and condenser 82 may be made variable through some predetermined range so that the natural resonant frequency of the oscillator may be tuned to some particular frequency. Normally, this frequency will be in a region extending up to a few kilocycles, for example 35 to 50 kcs.

The electrical leads 54 and 56 from the coil 52 may be interconnected with the ground line 66 and the opposite side of the condenser 78. It may be appreciated that the potential at the junction 84 between the condenser 78 and the inductance 76 will be determined by the voltage generated in the coil 52. The junction 84 may be connected with the base 60 by means of a resistor 86. The base 86 will thus be at a voltage that is a function of the amplitude of the voltage generated in the coil 52. However, it will be reduced from this level by the voltage dividing action of the resistor 68 and the resistor 86.

In the event that it is desired to remotely control a function such as the adjustment of a television receiver 8, the operator may turn the thumb wheel 50 through a sufficient arc to cause one of the arms 48 on the star wheel 42 to deflect the free end 38 of the spring 36 and release it. The free end 38 will then vibrate and carry the magnetized core member 20 through the air gap 30. As this vibratory motion of the spring 36 and the core member 20 occurs, the size of the air gap 30 will vary. This, in turn, will cause the density of the flux within the magnetic circuit 16 to vary. As the flux varies, the coil 52 will be energized and generate a voltage.

The magnitude of the voltage developed between the two leads 54 and 56 will be a function of the rate at which the core member 20 moves through the air gap 30. Also, the frequency of the voltage will be determined by the frequency at which the spring 36 vibrates. The voltage will be generated only as long as the spring 36 continues to vibrate which, of course, will be determined by the various parameters of the power supply 62.

By way of example, in one operative power supply the voltage developed during the initial portions of the vibrations was on the order of 5 or 6 volts. Although this voltage immediately decreases in an exponential manner it is possible to obtain a power on the order of 1 watt for a period of about ½ second. If the particular application requires more power for a longer period of time the strength of the spring, the flux field, etc., may be increased. It may be seen that although the present power supply is shown as being used to drive a transmitter 10, it may be used to energize any load having requirements of the type described above.

When the spring 36 vibrates, the voltage developed in the coil 52 will be carried across the two leads 54 and 56 and applied to the opposite side of the condenser 78. The voltage present at the junction 84 will be applied across the two resistors 86 and 68. These resistors 68 and 86 will then act as a voltage divider and apply a predetermined part of the potential to the base 60 of the transistor 58. In addition, the voltage from the junction 84 will be coupled through the coil 76 to the collector 64. As a consequence, the transmitter 10 will be energized so as to oscillate at its own natural resonant frequency as determined by the settings of the coil 76 and condenser 82. The amplitude of the oscillations will in part be determined by the voltage at the junction 84. Since the amplitude of the voltage from the coil 52 is fluctuating at the frequency of the spring, the potential at the junction 84 will also be varying. As a consequence, the amplitude of the oscillations will fluctuate whereby they will be amplitude modulated at the same frequency as the spring 36.

The winding 76 will be effective to radiate the energy of these oscillations in the form of an amplitude modulated carrier wave. The carrier will have a frequency equal to the resonant frequency of the oscillator. The amplitudes modulation will have a frequency which corresponds to the frequency of the spring 36. The radiated command signals will be received by the remote control receiver 13 on the television receiver 8. When it receives a command signal it will make an adjustment to the receiver 8. If it is desired to permit the making of a plurality of adjustments, means may be provided which will modify the frequency at which the spring 36 vibrates. Although this may be accomplished in any desired manner, in the present instance, a movable dampener 88 is provided which engages the spring 36. This dampener 88 may be movable longitudinally of the spring 36 whereby the effective length of the spring 36 will be modified. This, in turn, will cause the natural resonant frequency of the spring 36 to change so that the modulating frequency applied to the carrier wave will also be varied. As a result, the radiated command signal will have the same carrier frequency but will be modulated by a frequency that corresponds to the adjustment to be made. The remote control receiver 13 may then sense the modulation frequency and produce the desired adjustment.

As an alternative, the embodiment of FIGURE 3 may be employed. This embodiment includes a camera 100 for taking a picture of a predetermined area and a photoflash gun 102 for illuminating the area while the picture is being taken. The camera 100 may be of conventional design with the film and operative elements of the camera being contained in or on a case 104. A lens 106 may be provided on the front of the case 104 for focusing an image of the area to be photographed onto the film. A shutter is disposed in the lens 106 or adjacent the film. The shutter will be effective to open and allow the image to be projected onto the film for a predetermined exposure time.

A cable release 108 is interconnected with the shutter for momentarily opening the shutter when it is desired to take a picture.

In order to facilitate the taking of the picture and the proper exposure of the film, the photoflash gun 102 is mounted integral with the camera 100. The flash gun 102 will be effective to ignite a photoflash bulb 110 at the correct time. It should be understood that the flash gun 102 may be removed from the camera 100 and utilized as a separate device.

The various elements of the flash gun 102 may be secured to a support 114 that is an integral part of the camera case 104 or is releasably attached thereto. A magnetic circuit 112 similar to the magnetic circuit 16 in the first embodiment may be secured to the center of the support 114. The circuit 112 includes first and second core members 116 and 118 of a magnetic material. This will insure the magnetic circuit 112 having a low reluctance and a high flux density.

The first core member 116 includes a base on one side that fits against the support 114. The opposite side includes an air gap 120 having a pair of parallel faces 122. The second core member 118 includes a pair of faces 124 that are separated by approximately the same length as the air gap 120. The second core member 118 may be readily moved into and out of the air gap 120 so that the pole faces 122 and 124 will be separated by a minimum or maximum spacing. In order to maintain a flux field within this magnetic circuit 112 and particularly across the air gap 120, the first member 116 is permanently magnetized. As a consequence, the ends of the member 116 will form north and south magnetic pole faces 122 with magnetic flux lines extending longitudinally of the air gap 120 and through any portions of the second core member 118 disposed within the air gap 120.

In order to support the second core member 118 adjacent the air gap 120, a cantilever leaf spring 126 is secured to a vertical pedestal 130. This will position the free end 128 of the cantilever spring 126 adjacent the air gap 120. The second core member 118 is secured directly to the leaf spring 126 so that it will be carried by the vibrating end 128 of the spring.

In order to excite the spring 126 into vibrating and moving the second core member 118 through the air gap 120, a suitable means may be provided for deflecting the free end 128 of the spring 126 out of position and then releasing it. In the present instance this is accomplished by means of a star wheel 132 mounted on a shaft 134 which is carried by a bracket 136. The bracket 136 is secured to the support 114 so that the star wheel 132 will be slightly spaced from the free end 128 of the spring 126. When the star wheel 132 is in the position shown, the end 128 of the spring 126 will be free to vibrate. However, as the wheel 132 rotates, the end of one arm will engage the end of the spring, deflect it out of position and release it to vibrate freely.

During the course of vibrating, the spring 126 will carry the second core member 118 into and out of the air gap 120. As a consequence, the overall reluctance of the magnetic circuit 112 will periodically vary. When the core member 118 is in the air gap 120 the flux density resulting from the permanent magnetization of the first core member 116 will be a maximum when the core member 118 is in the air gap and a minimum when the core member 118 is out of the gap 120. In order to sense these variations in the flux density and to generate a voltage, suitable coil means may be provided around at least a portion of the magnetic circuit 112. In the present instance, the coil 138 is wound around one arm of the first coil member 116 so as to encompass substantially all of the lines of flux in the field. Thus, as the second core member 118 vibrates through the air gap 120, the resultant variations in the flux density will generate a voltage in the coil 138 which will appear across the two output conductors 140 and 142.

These two conductors 140 and 142 may be interconnected with a filament in the photoflash bulb 110. This interconnection is accomplished by means of a socket 144 mounted in a reflector 146 adapted to receive the photoflash bulb 110. As a consequence, the voltage developed within the coil 138 will be effective to cause a sufficient current to flow through the flashbulb to ignite the filament.

In order to actuate the shutter and to cause the spring 126 to vibrate, a suitable drive mechanism may be interconnected with the shaft 134. In the present instance, a thumb wheel 148 is provided on the shaft 134. When rotated it will cause the shaft 134 to rotate and carry the star wheel 132 over the end of the spring 126. In addition, the cable release 108 may be interconnected with the shaft 134 so that the movement of the shaft 134 will be effective to move the cable release 108 and actuate the shutter mechanism. By a proper adjustment of the relative positions of the star wheel 132 and the cable release 108, the timing of the shutter may be adjusted so that it will open at the instant the flashbulb 110 reaches its peak intensity.

As a further alternative, the embodiment of FIGURE 4 may be provided. This embodiment is very similar to the preceding embodiments in that it is particularly adapted to generate a short pulse of energy. This pulse generator 150 includes a support 152 having a magnetic circuit 154 mounted on the middle thereof, a cantilever spring 156 mounted on one end of the support 152 and a star wheel 166 mounted on the opposite end of the support. The magnetic circuit 154 includes a first core member 158 having an air gap 160 disposed adjacent the leaf spring 162 and a second core member 164 which is mounted on the leaf spring 162 so as to vibrate through the air gap 160. The star wheel 166 is positioned so as to engage the end of the leaf spring 162 and cause it to vibrate and carry the second core member 164 through the air gap 160.

One or both of these core members 158 and 164 may be permanently magnetized so as to maintain a high flux density in the region of the air gap 160. A pick up coil 168 may be wound about the second core member 164 so as to be carried with the core member 164 while the spring 162 is vibrating. As a consequence, when the spring 162 is vibrating the coil 168 will be moved into and out of the flux field maintained across the air gap 160. As the coil 168 cuts the flux lines, a voltage will be generated within the coil 168 so as to be present between the two conductors 170 and 172 leading to the coil.

As a further alternative, the generator 180 of FIGURE 5 may be employed. Although this embodiment has a different shape and appearance from the preceding generators, it is basically the same. More particularly, it includes a cylindrical housing 182 having a pair of substantially plane end walls 184 and 186.

A rigid support 192 is secured to the first wall 184. A plurality of core members 188 are secured to the support 192 in an annular array that is substantially concentric with the axis of the housing 182. The support 192 and the core members 188 includes a magnetic material with a high permeability so as to form at least a portion of a magnetic circuit for containing a high density magnetic flux field. A pickup coil 190 is wound around each of these core members 188 so that they will encompass the flux in the members 188.

A pedestal 194 of magnetically permeable material is secured to the center of the support 192. This pedestal 194 is substantially coaxial with the center of the cylindrical array formed by the core members 188. A second support 196 similar to the first support 192 is secured to the free end of the pedestal 194. Preferably, the support 196 is movably mounted on the pedestal 194 whereby the support 196 may be rotated about the axis of the pedestal 194. A spring 198 is attached between the two supports 192 and 196 so as to bias them into a predetermined alignment.

A plurality of second core members 200 are secured to the second support 196. The core members 200 are disposed in a second annular array that is substantially identical to the array of the first core members 200. As a result, when the spring 198 retains the support 196 in its normal position, the ends of hte core members 200 will be aligned with the ends of the core members 188. However, the aligned ends will be separated by air gaps 202.

The pedestal 194, the support 196 and the core members 200 also include a magnetically permeable material so as to complete magnetic circuits that include the air gaps 202. One or more of the magnetically permeable members are permanently magnetized so as to maintain a flux field in the core members 188 and 200 and across the air gaps 202.

A control knob 204 is secured to the support 196 so as to permit a person holding the housing 182 to deflect the support 196 out of position and to then release it whereby the spring 198 will bias the support 196 and core members 200 back into position. In order to use this generator, the operator may grasp the housing 182 in one hand and rotate the knob 204 with the other hand so as to wind the spring 198. The knob 204 is then released whereby the spring 198 will cause the second support 196 and the core members 200 to oscillate about the axis of the pedestal 194. As this oscillation occurs, the ends of the core members 200 will move relative to the ends of the core members 188. This will periodically vary the size of the air gaps 202. This, in turn, will cause the flux density to vary whereby a voltage will be generated within the coils 190.

While only a limited number of embodiments of the present invention have been disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. An electric power supply for generating a pulse of electrical energy, including the combination of:

a magnetic circuit having a first group of core members arranged concentrically about an axis at predetermined circumferential increments, a second group of core members disposed concentrically about said axis and spaced from the first core members to form a plurality of magnetic circuits having air gaps, means for movably supporting the two groups, said means being effective to allow the members in the first group to move about the axis relative to the members in the second group to vary the size of the air gaps and vary the reluctance of the magnetic circuits, resilient means interconnected with the first group to cause the second group of members to oscillate about the axis relative to the first group, a source of magnetomotive force in each of the magnetic circuits to maintain flux fields that circulate through the core members in the first and second groups and across said air gap, said flux fields having flux densities that are functions of the positions of the core members in the group and the sizes of the air gaps, and coil means on the core members in at least one of said groups to encompass at least a portion of the flux fields to generate a voltage in response to the movement of the second core member through the air gap.

2. An electrical power supply for generating a pulse of electrical energy, including the combination of:

a support, a first group of core members mounted on the support in an annular array around an axis, a second group of core members secured together to form a second annular array, means movably securing the second group to the support concentric with the axis and adjacent the core members in the first group to thereby form a plurality of magnetic circuits having air gaps between the members in the two groups, said means being effective to allow the second group of core members to move relative to the first group of core members to thereby vary the sizes of said air gaps whereby magnetic reluctance of the magnetic circuits will vary, spring means secured to said support and to the second group, the spring means being effective when distorted from its neutral position and released to cause the second group to oscillate and cause an oscillatory variation in the sizes of the air gap, the core members in at least one of said groups being permanently magnetized to permanently maintain a flux field in said magnetic circuits having flux densities that are functions of the position of the second group of core members relative to the first group of core members and the sizes of the air gaps, and coil means on the core members in at least one of said groups to encompass at least a portion of the flux field in the magnetic circuits, said coil means being effective to generate a voltage in response to the variations of the flux fields produced by the oscillatory movement of the core members in the second group about the axis.

3. An electrical power supply for generating a pulse of electrical energy, including the combination of:

a support, a first group of core members mounted on the support in an annular array around an axis, a second group of core members secured together to form a second annular array, means movably securing the second group to the support concentric with the axis and adjacent the core members in the first group to thereby form a plurality of magnetic circuits having air gaps between the members in the two groups, said means being effective to allow the second group of core members to move relative to the first group of core members to thereby vary the sizes of said air gaps whereby magnetic reluctance of the magnetic circuits will vary, spring means secured to said support and to the second group, the spring means being effective when distorted from its neutral position and released to cause the second group to oscillate and cause an oscillatory variation in the sizes of the air gap, the core members in at least one of said groups being permanently magnetized to permanently maintain a flux field in said magnetic circuits having flux densities that are functions of the position of the second group of core members realtive to the first group of core members and the sizes of the air gaps, coil means on the core members in at least one of said groups to encompass at least a portion of the flux field in the magnetic circuits, said coil means being effective to generate a voltage in response to the variations of the flux fields produced by the oscillatory movement of the core members in the second group about the axis, and means to rotate the second group about the axis to tension the spring means and to then release the second group so as to oscillate about the axis.

References Cited

UNITED STATES PATENTS

| 1,416,110 | 5/1922 | Mason | 310—155 |
| 3,148,330 | 9/1964 | Malerbi | 325—102 |
| 2,972,937 | 2/1961 | Suits | 95—11.5 |
| 1,690,248 | 11/1928 | Remy | 310—15 X |
| 2,976,398 | 3/1961 | McKee | 95—11.5 X |
| 2,111,643 | 3/1938 | Salvatori | 340—17 |
| 2,085,760 | 7/1937 | Loar. | |
| 2,972,922 | 2/1961 | Rhodes. | |

JOHN M. HORAN, Primary Examiner

U.S. Cl. X.R.

95—11.5

UNITED STATES PATENT OFFICE
CERTIFICATE OF CORRECTION

Patent No. 3,480,808                                        November 25, 1969

Harold F. Rieth

It is certified that error appears in the above identified patent and that said Letters Patent are hereby corrected as shown below:

In the heading to the printed specification, lines 3 to 5, "Harold F. Rieth, Santa Monica, Calif., assignor to Packard-Bell Electronics Corporation, Los Angeles, Calif., a corporation of California" should read -- Harold F. Rieth, 911 22nd St., Santa Monica, Calif. 90403 --.

Signed and sealed this 27th day of October 1970.

(SEAL)
Attest:

Edward M. Fletcher, Jr.                      WILLIAM E. SCHUYLER, JR.

Attesting Officer                               Commissioner of Patents